INVENTORS
THOMAS E. CROLEY
RICHARD O. MORGAN
BY MAHONEY, MILLER & RAMBO

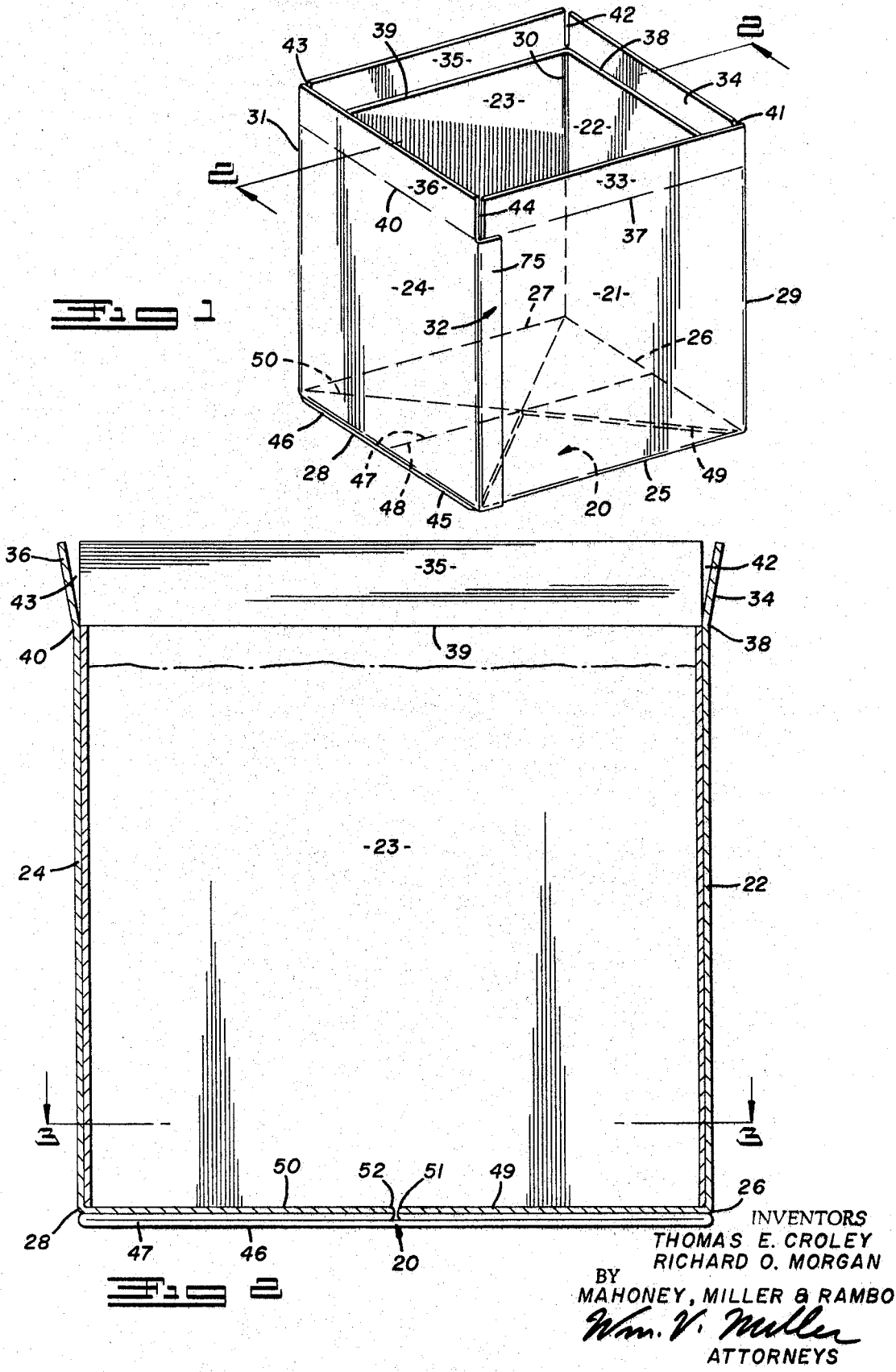

ATTORNEYS

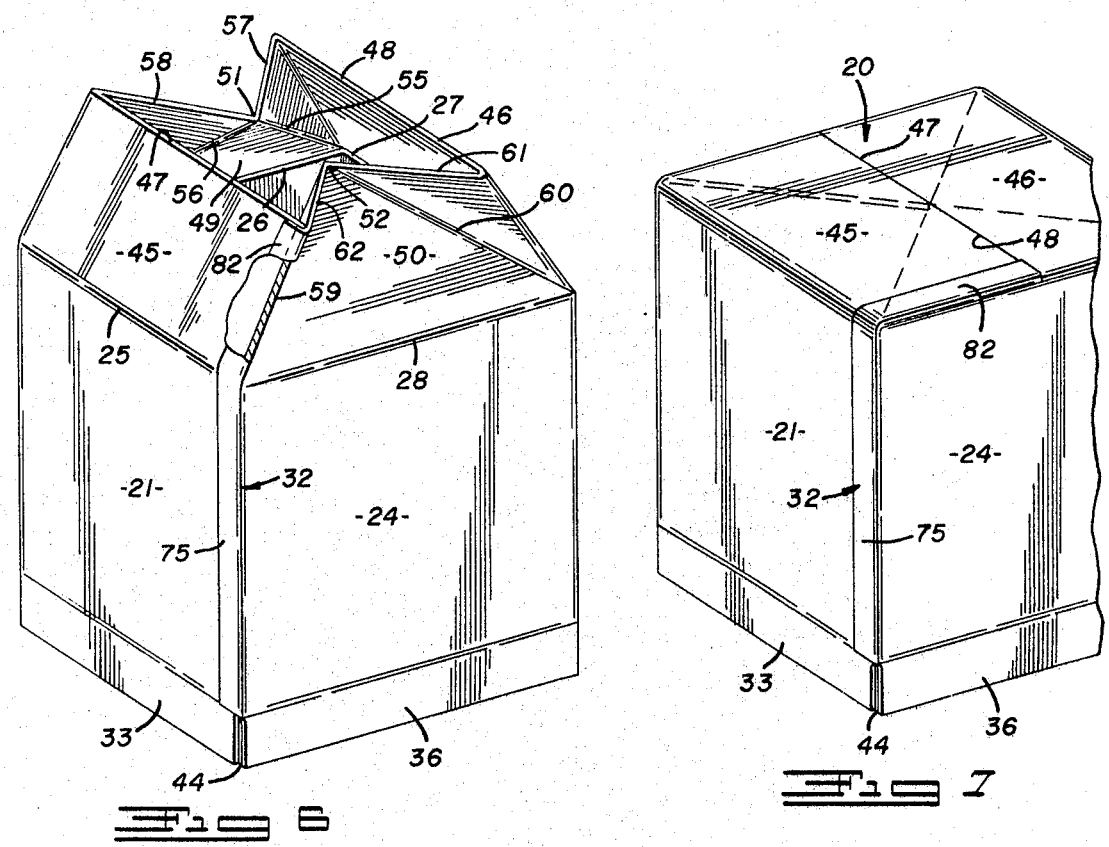
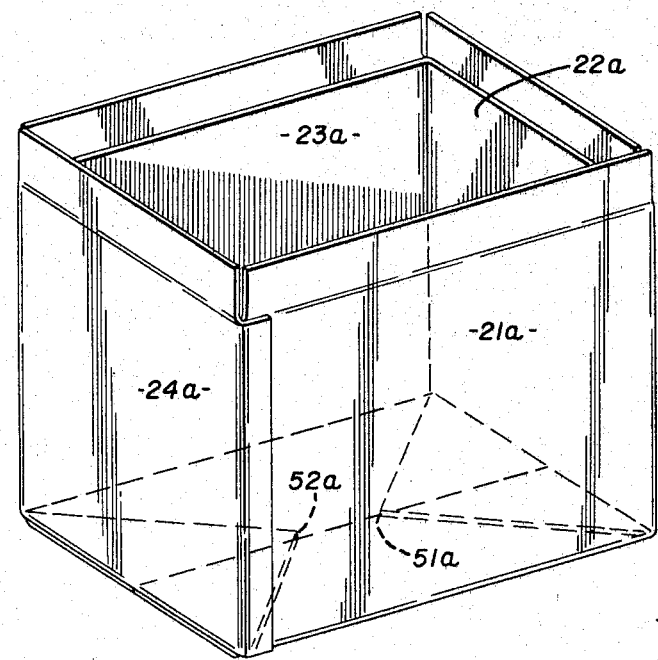

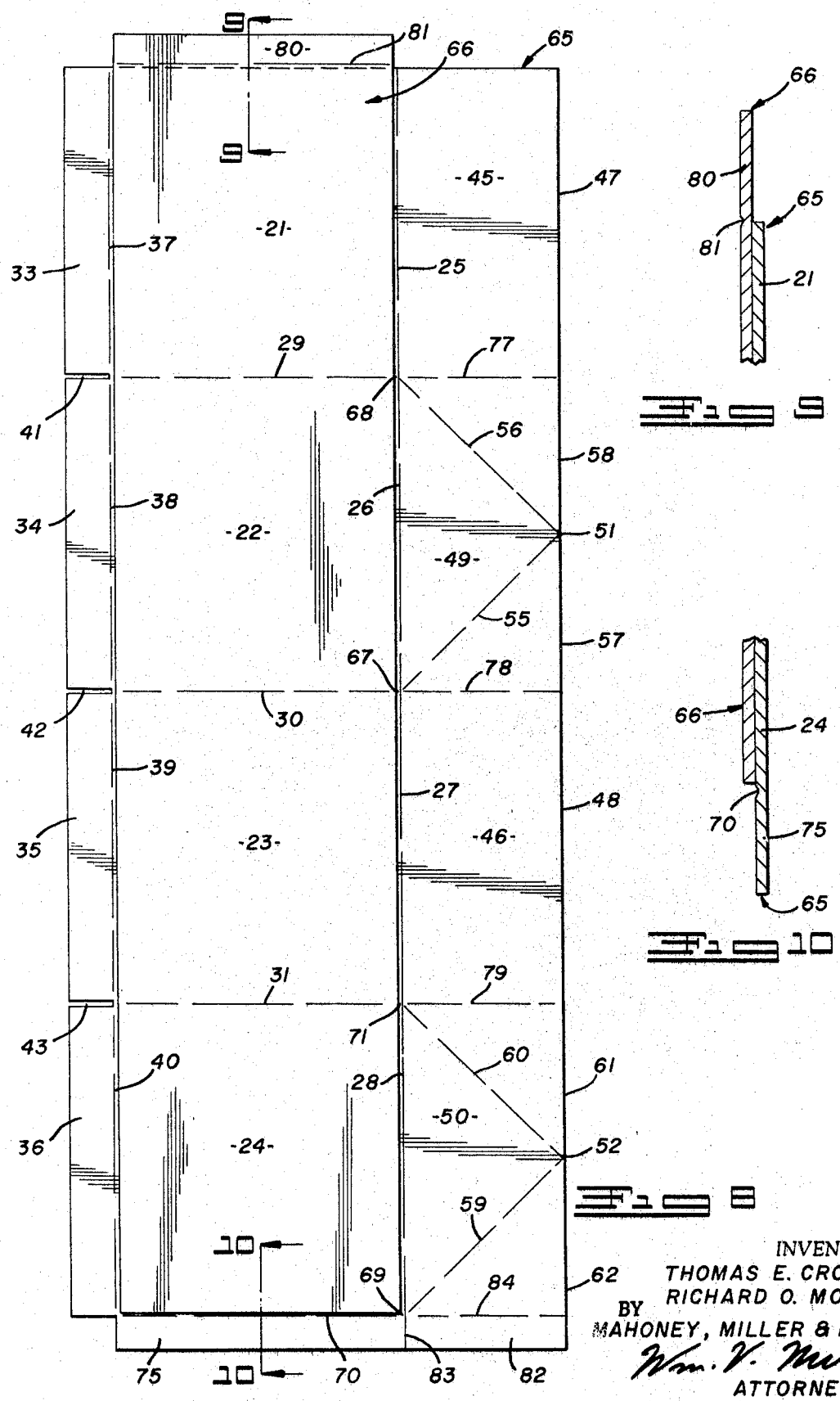

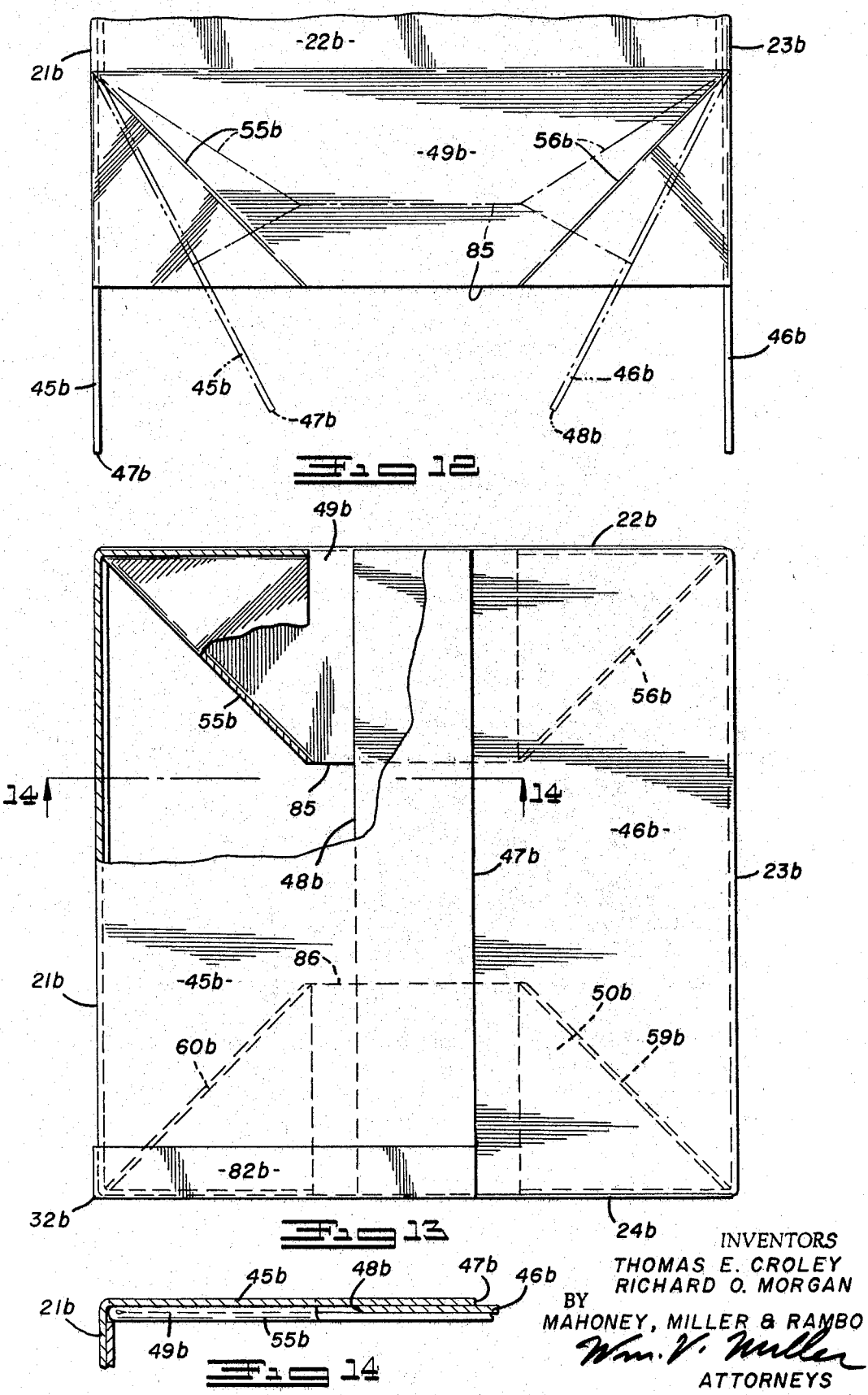

United States Patent Office 3,523,635
Patented Aug. 11, 1970

3,523,635
FIBERBOARD BOX HAVING STRENGTHENED BOTTOM STRUCTURE AND CONNECTOR CORNER JOINT
Thomas E. Croley and Richard O. Morgan, Worthington, Ohio, assignors to The Corrugated Container Company, Columbus, Ohio, a corporation of Ohio
Filed May 2, 1968, Ser. No. 726,128
Int. Cl. B65d 5/02
U.S. Cl. 229—37      2 Claims

ABSTRACT OF THE DISCLOSURE

A box of fiberboard or similar material of square or rectangular horizontal cross section which has a special strengthened bottom structure and a strengthened corner structure which are structurally joined to improve the overall strength of the box. The bottom comprises four flaps integrally joined to the corresponding four side walls at horizontal hinge lines, two of the opposed flaps being rectangular flaps which fold inwardly toward each other and the other two flaps being provided with diagonal scored fold lines to permit infolding relative to the other two flaps to which they are integrally connected at straight corner scored fold lines. The strengthened connector corner joint, which is at the joint where the box blank is connected together, comprises a double thickness corner hinge or fold joint which is provided with an extension into the bottom structure to connect the strengthened corner joint and the bottom structure together for overall strength of the box. The diagonal score lines in the one pair of flaps extend completely to the respective corner fold lines of the other pair of flaps where they are hinged to the respective side walls by the horizontal scored hinge lines.

---

The usual fiberboard box comprising a flat bottom with upright side walls along its periphery lacks strength against outward bulging at the joint where each upright or vertical wall joins to the associated horizontal or flat bottom flap. This is especially true when the box is open at its top and the side walls are not held in their original position by a top closure structure secured thereto. When such a box is used for containing readily flowable or shiftable bulk material, such as small particle or granular material, there is a tendency for the box to bulge outwardly at each hinge joint between an upright side wall and associated horizontal bottom wall or flap due mainly to relative displacement of the bottom flaps. Also, with the usual box of this type there is a tendency for it to give way at the blank connector joint which is at one of the vertical corners between two of the upright side walls disposed at a right angle.

It is an object of this invention to provide a fiberboard box having upright walls joined to a flat bottom, the bottom being of increased strength and joined to the upright side walls by integral joints, the bottom being formed by integrally connecting flaps which are folded into a flat formation in such a manner as to provide for resistance to relative displacement so as to obtain maximum strength and reinforcement of the box throughout its girth or perimeter at the bottom.

Another object of this invention is to provide a connector joint at the upright vertical joint, which corresponds to the ends of the flat blank used in producing the box, which is strengthened to prevent slitting at this joint during use of the box and to provide connecting means between the strengthened bottom structure and the strengthened corner joint to obtain cooperation therebetween in increasing the perimeter strength and the overall strength of the box.

Another object of this invention is to provide a box which has a bottom structure that is more effective against outward sifting or seepage of the contents and entrance of moisture due to the integral connection of the four flaps forming the bottom.

A preferred embodiment of this invention is illustrated in the accompanying drawings in which:

FIG. 1 is a perspective view of a box having the strengthened bottom and corner.

FIG. 2 is an enlarged vertical sectional view taken along line 2—2 of FIG. 1.

FIG. 6 is a perspective view of the inverted box showing the bottom being folded inwardly into position.

FIG. 7 is a similar view showing the bottom folded into its final flat position.

FIG. 8 is a plan view of a blank used in forming the box.

FIG. 9 is an enlarged detail in section taken along line 9—9 of FIG. 8.

FIG. 10 is a similar view taken along line 10—10 of FIG. 8.

FIG. 11 is a perspective view of a modification of the upright set-up box of this invention.

FIG. 12 is a side elevational view of a modified type of infolding bottom structure showing it before it is folded into closed and indicating by broken lines how it is so folded.

FIG. 13 is a bottom plan view, partly broken away, showing the bottom infolded into final position.

FIG. 14 is a vertical sectional view taken along line 14—14 of FIG. 13.

Figure 3:
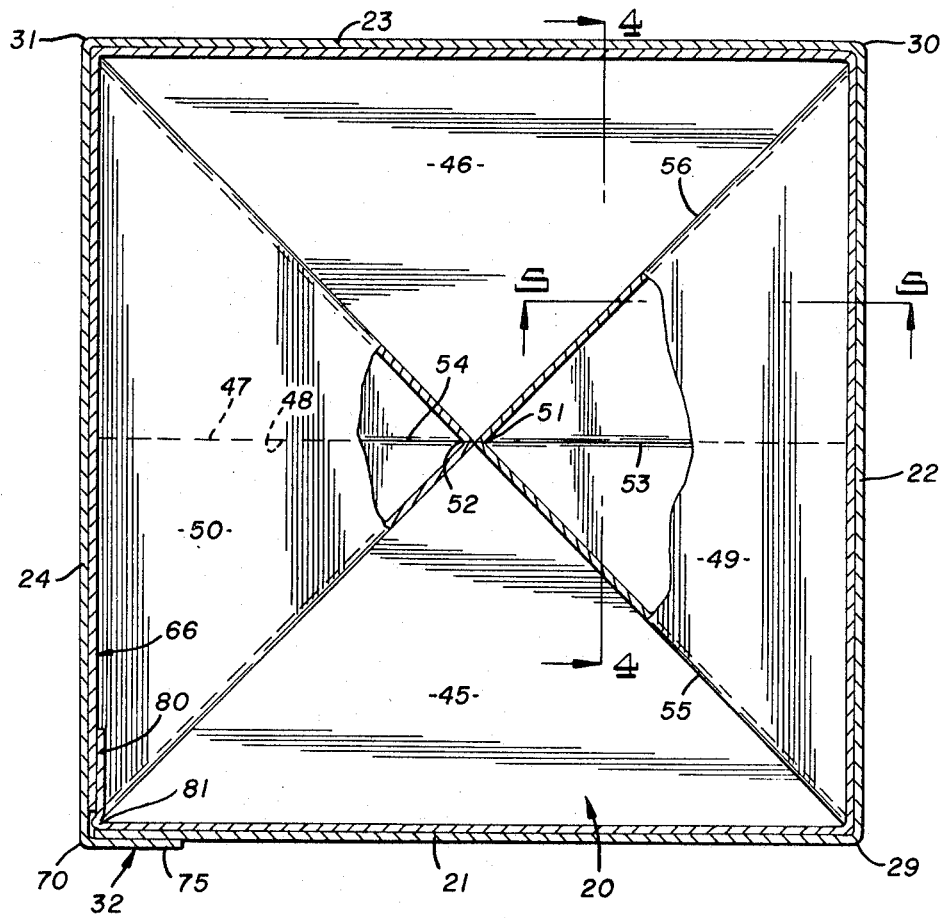
FIG. 3 is a horizontal sectional view, partly broken away, taken along line 3—3 of FIG. 2.
Figure 4:
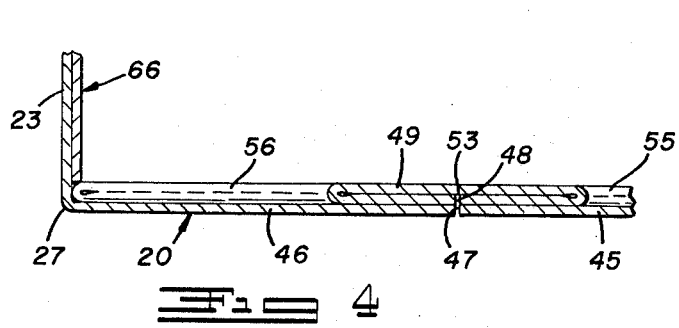
FIG. 4 is a detail in vertical section taken along line 4—4 of FIG. 3 through the bottom of the box.
Figure 5:
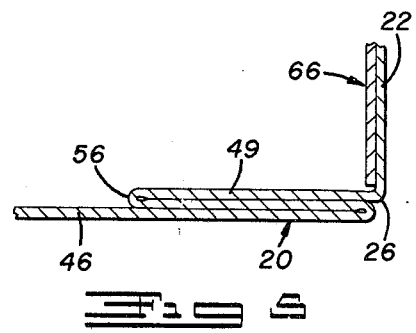
FIG. 5 is a similar view taken along line 5—5 of FIG. 3.

With reference to the drawings, the one form of the invention is illustrated in FIGS. 1 to 10 and is shown as an upright box of substantially square horizontal cross section, as shown best in FIG. 1, which includes a substantially flat bottom 20, four upright side walls 21, 22, 23, and 24, integrally joined to the bottom at the respective horizontal fold or hinge joints 25, 26, 27, and 28, respectively, so that the upright walls are normal to the plane of the bottom 20. The upright walls 21, 22, 23, and 24 are arranged at right angles to each other around the periphery or perimeter of the bottom 20 and are connected to each other at the respective integral hinge lines 29, 30, and 31. The one corner, which corresponds to the ends of the flat blank used in forming the box, is provided with a special strengthened connector corner structure 32. Suitable top closure means may be provided which, for example, may be attached to minor flaps or tabs 33, 34, 35, and 36, which may be connected to the respective upright walls 21, 22, 23, and 24 at the integral fold or hinge joints 37, 38, 39, and 40, these flaps being separated by the vertical corner slits 41, 42, 43, and 44. However, the particular top closure or its attaching means is not important to this invention.

The strengthened bottom structure 20, as shown in FIGS. 2 to 5, comprises the opposed inwardly extending rectangular single thickness flaps 45 and 46, which have their respective inner edges 47 and 48 meeting at the transverse center line of the bottom, and the opposed inwardly extending triangular double thickness flaps 49 and 50 which have their points or vertices 51 and 52 meeting at the center of the bottom. The flap 45 is integrally connected to the upright side wall 21 at the fold line 25 and the opposed flap 46 is integrally connected to the opposed upright side wall 23 at the fold line 27. The triangular flap 49 is integrally joined to the upright side wall 22 at the fold line 26 and the opposed triangular flap 50 is integrally joined to the opposed upright side wall 24 at the fold line 28. The flaps 49 and 50 will be in laminated relationship with the flaps 45 and 46 in the setup box as indicated in FIG. 3. In the example shown, the triangular flaps will be on top or inwardly of the rectangular flaps but, as will appear later, their positions may be reversed. The triangular flap 49, as shown best in FIG. 6, is provided with side edge-forming diagonal fold lines 55 and 56 at the edges of the flap and in converging relationship to the point 51. Also, the flap 49 has the opposed free edges 57 and 58 which, when it is infolded in the set-up of the box, meet along a line 53 (FIG. 3) bisecting the triangular flap. Similarly, the triangular flap 50 is provided with side-edge-forming diagonal fold lines 59 and 60 in converging relationship to the point 52 and the opposed free edges 61 and 62 which meet along a line 54 (FIG. 3) bisecting the triangular flap when the box is set up. The lines 53 and 54 are in alignment with each other and in the same vertical plane as the center line joint between the flaps 45 and 46. Each diagonal fold line diverges from the point 51 or 52 to the respective corner or vertical fold line of the box.

The walls 21, 22, 23, and 24 are formed as part of a main blank 65 shown in FIG. 8. These walls are preferably made of double thickness by the use of a liner blank 66 which is placed on the upper surface of the blank 65, as shown in FIG. 8, and will form an inner liner when the box is set up. The main blank 65 is scored to provide the various upright walls 21, 22, 23, and 24, the rectangular flaps 45 and 46 and the triangular flaps 49 and 50, as well as the various fold joints and edges referred to above in discussing the set-up box structure. The flaps 33, 34, 35, and 36 may also be produced but, as indicated, these are not important to the invention and will not be further discussed. It will be noted that the portions of the blank which provide the upright walls 21, 22, 23, and 24 and the portions which provide the bottom flaps 45, 46, 49, and 50 are integrally joined. Thee inner liner 66 may also be scored at lines in alignment with lines 29, 30 and 31 and be adhesively secured to the inner faces of the upright wall portions.

It will also be noted that the diagonal score line 55 diverges from the point 51 to the corner point 67 located at the junction of the score lines 26 and 30 and the diagonal score lines 56 diverges from the point 51 to the corner point 68 located at the junction of the score lines 26 and 29. Also, that the diagonal score line 59 diverges from the point 52 to the corner point 69 located at the junction of the score lines 28 and 70 and the diagonal score line 60 diverges from the point 52 to the corner point 71 at the junction of the score lines 28 and 31.

The strengthened connector corner structure 32 in the set-up box is shown in FIGS. 3, 6 and 7 and comprises an outer corner connector flap 75 and an inner connector corner flap 80 which are disposed at the vertical corner where the opposed free edges of the combined double blank structure of FIG. 8 are connected together when the box is partially set up by folding it along the fold lines 29, 30 and 31 and the respective aligning fold lines 77, 78 and 79 in the blank. The connector flap 75 is an extension of the main blank 65 beyond the adjacent end of the said liner 66 and is integrally hinged thereto at the fold line 70 whereas the connector flap 80 is an extension of the other end of the liner 66 beyond the adjacent end of the main blank and is integrally hinged thereto at a scored fold line 81. The flap 80 is merely co-extensive with the wall 21 whereas the flap 75 is provided with a bottom extension 82 thereof integrally connected thereto at the fold line 83 and to the adjacent bottom flap along the scored fold line 84. This corner arrangement in the set-up box disposes the connector flaps 75 and 80 at a right angle to each other (FIG. 3) and each extending outwardly from its corner fold with the flap carried by the one double wall in face contact with and overlapping the one surface of the second double wall and with the flap carried by the second wall in face contact with and overlapping the opposite surface of the other wall. This also provides a double thickness corner fold joint by the inner fold 81 and the outer fold 70 providing a corner connection even if one of the corner folds does rip or tear. In addition, the extension 82 of the outer connector flap 75 does extend into the bottom structure being adhesively secured to the bottom side of the flap 45 to join the outer wall structure and the bottom structure so that they function together to give overall strengh to the box.

The manner in which the blank of FIG. 8 is folded to obtain the final box structure of FIG. 1 previously described is illustrated in FIGS. 6 and 7. As indicated, the blank is first bent into square tubular form with the outer connector flap 75 overlapping the outside face of the upright wall 21 and being adhesively secured thereto, the extension 82 extending over the bottom flap 45 and being adhesively secured thereto. The inner connector flap 80 at this time overlaps the inner surface of the inner liner 66 of the wall 24 (FIG. 3) and is adhesively secured thereto. The bottom is formed by first forming the triangular flaps 49 and 50, as shown in FIG. 6, assuming they are to be inside. This is accomplished by folding the opposed flaps inwardly along the respective pairs of diagonal converging fold lines 55–56 and 59–60 and the main fold lines 26 and 28. At the same time the flaps 45 and 46 are drawn inwardly, since all the bottom flaps are connected in a continuous structure, and will eventually be moved flat into overlapping relationship to the inner triangular flaps 49 and 50 in the final structure shown in FIG. 7 and previously described. Because all of the upright walls are integrally connected to the bottom structure at the fold lines 25, 26, 27, and 28, and because all of the bottom flaps are connected in a continuous structure at the folds lines 77, 78, 79, and 84 in a horizontal plane, the bottom structure is strengthened and the upright side walls where they join the bottom are strengthened so that they will resist outward bulging under load. Also, the extension 82 of the strengthened corner structure 32 will extend into the bottom structure as shown in FIG. 7 and will structurally connect the corner and bottom structures.

As indicated above, the triangular flaps 49 and 50 could be formed on the outside of the bottom merely by folding the flaps 45 and 46 inwardly first which is possible because the diagonal fold lines 55, 56, 59, and 60 run to the respective vertical corner fold lines 30, 29, 70, and 31. Thus, the triangular flaps 49 and 50 extend the full width of the respective panels 22 and 24. Also, the rectangular flaps 45 and 46 extend the full width of the respective panels 21 and 23. No fastening of the overlapping flaps of the laminated bottom will be necessary, since the weight of the contents will be sufficient to hold the flaps in cooperative relationship. However, fastening means in the form of staples, adhesive or tape could be used.

It is preferred that the box be square but it could be made of rectangular cross section, as indicated in FIG. 11. In this instance, the walls 21a and 23a would be longer than the panels 22a and 24a which carry the triangular flaps, the points 51a and 52a of which would be spaced but otherwise the structure would be substantially the same. The box could be made longer in the other direction, with walls 22a and 24a longer than walls 21a and 23a (not shown), but in that case the points 51a and 52a would meet.

In the example of the box shown in FIGS. 6 and 7, the rectangular bottom flaps 45 and 46 are of a width corresponding to the wall panels 21 and 23 and each is of a depth or inward extent one-half the width of the wall panels 22 and 24. Consequently, the respective inner edges 47 and 48 of the flaps 45 and 46 are in abutting relationship at the transverse center line of the bottom of the box. Also, the triangular flaps are of a width corresponding to that of the panels 21 and 23 and are of an inward extent or depth corresponding to one-half the width of the wall panels 22 and 24 so that the points 51 and 52 meet along a line corresponding to the abutting edges 47 and 48 of the other flaps. However, a different bottom structure is illustrated in FIGS. 12 to 14 in which the inwardly folded diagonal flaps 49b and 50b do not come to a point but their inner edges 85 and 86, respectively, are blunt and spaced apart in parallel relationship at opposite sides of the transverse center line of the box. Thus, these flaps are of a width corresponding to the wall panels 22b and 24b and each is of a depth or inward extent less than one-half the width of the other wall panels 21b and 23b. The square or rectangular flaps 45b and 46b, in this example, overlap each other adjacent the center of the box since each is greater in depth or inward extent than one-half the width of the wall panels 22b and 24b. Thus, the inner edges 47b and 48b are disposed in spaced parallel relationship on opposite sides of the center line of the bottom.

As indicated in FIG. 12, the flaps 49b and 50b may first be folded inwardly as indicated by the broken lines, and then the flaps 45b and 46b are folded onto the diagonally scored flaps in laminated or covering relationship thereto. However, if desired, the flaps 49b and 50b could be positioned outermost. It will be noted that the diagonal score lines 55b–56b and 59b–60b thereof do extend to the associated vertical corners of the box as in the previous examples. It will also be apparent that the strengthened corner joint 32b is the same as before and its extension 82b extends into the bottom structure.

The blank for the box of FIG. 11 is not shown but would be the same as that shown in FIGS. 8 to 10 except that selected side wall panels and connected bottom closure flaps would be of different widths. Also, the blank for the box shown in FIGS. 12 to 14 is not shown but this would be practically the same as that shown in FIG. 8 except the bottom closure flaps 45 and 46 would project outwardly farther and the diagonally scored flaps would terminate shorter relative to the common-hinge line connecting those flaps to the side panels.

It will be understood that in all such blanks the bottom closure flaps are connected to the side panels along a continuous scored hinge line, which in FIG. 8 is formed by the aligning score lines 25, 26, 27, 28, and 83, and in this consideration the connector flap 75 may be considered a side panel having the bottom closure flap 82 connected thereto. The bottom closure flaps are connected together in a continuous strip, which is hinged to the side-forming panels, along the common hinge line and the closure flaps are continuously connected together at the hinge score lines 77, 78, 79, and 84. In the usual box structure, the joints corresponding to the joints 77, 78, 79, and 84, are slit and therefore weaken the structure. In order to permit inward folding of the integrally connected closure flaps, two of the opposed flaps are diagonally scored as indicated, these two flaps being between two of the other flaps which are not diagonally scored. Thus, the infold flap which provides the triangular flap 49 is between the flaps 45 and 46, to which it is integrally connected, and the infold flap which provides the triangular flap 50 is between the flaps 46 and 82, to which it is integrally connected.

It will be apparent that this invention provides a bottom structure in a box of the type indicated which is stronger because it is composed of four flaps integrally joined together, with two of the opposed flaps having the diagonal scoring to permit inward folding thereof even though they are connected to adjacent cover flaps. The flaps are so arranged that the plain flaps or the diagonal scored flaps may be folded innermost. The strengthened corner structure at the end of the blank, in each example, extends into the bottom structure to structurally connect the corner and bottom to increase the overall strength of the box.

Having thus described this invention, what is claimed is:

1. A box structure comprising an elongated wall-forming blank of material transversely scored to provide a series of walls integrally connected together at hinged corner joints which are spaced successively longitudinally of the blank and having free ends adapted to be connected together at a corner with two of the resulting walls at said ends disposed in angular relationship, means for connecting said walls together at said corner, said means comprising relatively angularly disposed connector flaps carried integrally by the respective walls at said corner to which they are connected by corner folds and extending outwardly from said folds, the connector flap carried by one wall being in face contact with and overlapping the one surface of the second wall and the connector flap carried by the second wall being in face contact with and overlapping the opposite surface of the first wall, and means for securing the contacting connector flaps and walls together, the connector flap on the one wall being disposed inside the second wall and the connector flap on the second wall being disposed outside the first wall, said walls being of double laminated structure comprising an inner liner lamination and an outer main lamination, the connector flap on the first wall being an extension of the inner lamination and the connector flap on the second wall being an extension in the opposite direction of the outer lamination, said liner lamination terminating at one end of the main lamination inwardly of the connector flap formed thereon and extending beyond the other end of the main lamination and having the other connector flap formed thereon so that it will lie in contact with the adjacent inner surface of said first end of the lamination, closure flaps connected to the outer main lamination of the respective walls along a common longitudinal scored hinge line and being substantially longitudinally co-extensive therewith and extending outwardly therefrom, said connector flap on the main lamination having an extension connected thereto along a scored hinge line in substantial alignment with said common longitudinal scored hinge line and extending outwardly therefrom, said closure flaps being folded inwardly on said common hinge line relative to said walls into cooperative overlapping relationship with said connector flap extension folded inwardly on its hinge line to overlap the adjacent closure flap.

2. A fiberboard box according to claim 1 in which said closure flaps and said connector flap extension are all integrally joined along scored hinge lines which are in alignment with and continuations of the respective hinged corner joints and corner fold of the connector flap on the main lamination, certain of said closure flaps being provided with diagonal score lines to permit inward folding on said common hinge line.

References Cited
UNITED STATES PATENTS

| | | | |
|---|---|---|---|
| 2,336,763 | 12/1943 | Wilcox | 229—37 |
| 2,439,435 | 4/1948 | Richardson et al. | 229—37 |
| 3,248,039 | 4/1966 | Locke | 229—37 |
| 3,275,217 | 9/1966 | Dornbush et al. | 229—37 |
| 3,291,369 | 12/1966 | Crawford | 229—37 |
| 3,361,326 | 1/1968 | Croley et al. | 229—37 |
| 3,365,111 | 1/1968 | McNair et al. | 229—37 XR |

DAVIS T. MOORHEAD, Primary Examiner